FIG. I

INVENTOR.
MICHAEL FIEHL

BY Maurice H. Klitzman

ATTORNEY

Dec. 29, 1959  M. FIEHL  2,919,130
CARD WEIGHT

Filed Dec. 8, 1958  3 Sheets—Sheet 2

Dec. 29, 1959    M. FIEHL    2,919,130
CARD WEIGHT

Filed Dec. 8, 1958    3 Sheets-Sheet 3

United States Patent Office 2,919,130
Patented Dec. 29, 1959

2,919,130

CARD WEIGHT

Michael Fiehl, Vestal, N.Y., assignor to International Business Machines Corporation, New York, N.Y., a corporation of New York Application December 8, 1958, Serial No. 778,960

6 Claims. (Cl. 271—44)

This invention relates to a card weight for use in a card feeding mechanism for a business machine, and, in particular, to a better method for removing the card weight from the hopper of a card feed used in connection with a business machine such as a sorter, collator, punch or reader, etc.

In general, a business machine, such as a sorter, collator, etc., is operated by placing cards containing information in a container known as a hopper. The hopper is constructed to enable the card to settle on the picker knife and the throat. The picker knife singly removes the cards from the hopper. The cards singly pass through the throat into a set of feed rolls in the card transport section. Additional feed rolls then transport the card throughout the machine where various operations are performed. These operations may be in the nature of sorting, collating, punching, reading, etc.

When handling large numbers of cards, a means has been used for continuously loading the hopper. This means is commonly referred to as a file feed which is positioned above the hopper and contains a complete tray of cards. This provides an automatic means for loading the hopper before they are fed by the picker knives into the throat. Also, it is important that the picker knife be prevented from engaging the cards as they come into the hopper from the file feed. Card weights placed on the picker knife perform this function. Also, card weights are placed on a deck of cards being fed to insure that there is sufficient weight on the card to make it settle in the proper position on the picker knife. Without a sufficient number of cards to back it up, there is a tendency for the card to float in the hopper and not settle in its proper position. Therefore, it is common practice to use a card weight which is placed in the hopper immediately above the cards so as to act on the picker knife. In addition, card weights are used to serve as dividers between groups of cards that are either being sorted, collated, read or punched. For example, if one column in one set of cards were being read for a group of cards, it may be a requirement that a different column be read for a succeeding group of cards. In that event, the machine must be stopped and the brushes for reading the card changed to its proper reading column. Therefore, the card weight serves as a means for automatically stopping the machine when a group of cards has been read.

Now, the file feed for automatically delivering cards to the hopper is operated by an automatically operated clutching means which is actuated by a pivotable plate. This pivotable plate is commonly known as a joggler plate which pats the cards into their proper position in the hopper. Generally cards are placed in the file feed in a staggered condition. As they are fed into the hopper, they are patted both from the side and from the back to properly align them for picking position by the picker knife. The joggler plate is also used as a means for disengaging the clutch for operating the file feed when the cards have reached a predetermined height in the hopper. When the cards have dropped below another predetermined height, means are provided on the joggler plate to energize the clutch so as to again feed cards from the file feed into the hopper.

Therefore, in order to start the machine either initially or when after a particular group of cards have been fed and the brushes have been moved over for another reading positioning, the joggler plate is pivoted out of the way in order to remove the card weight. After removing the card weight, the joggler plate is then permitted to spring back into position and the card weight is either placed back in the file feed or merely held out of the file feed until all the cards have been fed. It is then placed in the hopper until such time that the machine is used again.

The removal of the card weight from the hopper presents several major problems. The first has to do with the time element involved by the operator in order to open the joggler plate, remove the card weight, then close the joggler plate and dispose of the card weight before the machine can be operated. Secondly, when the card weight is removed from the hopper, the cards tend to stick to the card weight and to themselves. This requires that the operator peel the cards from the bottom of the weight and pack them back into proper position with the weight of the card. The weight of the cards in the hopper on the cards removed makes it difficult and time-consuming for the operator to properly align those cards that have been inadvertently removed. Another major problem has to do with the joggler plate when operating on the clutch means for automatically operating the file feed. In order for the joggler plate to continously pat the cards into alignment, it must be of sufficient mass. Therefore, when the spring-loaded joggler plate is pulled down for the operator to grasp the weight for removal from the hopper, there is a large dynamic force created when the joggler plate is allowed to snap back into position. When it does so, the dynamic force created on the clutch mechanism, which automatically operates the file feed, results in damage to the parts. The operator must be well trained to hold onto the plate as it goes back into position so as to maintain any force on the clutch mechanism at a minimum. However, the operator, being in a hurry, oftentimes omits to consider this problem and permits the joggler plate to snap back into position. When this happens the parts are generally damaged.

It is therefore a general object of this invention to obviate the above difficulties.

It is another object of this invention to provide a card weight for a card feed in a business machine which weight is capable of being removed from the hopper without the necessity of moving the joggler plate.

It is still another object of this invention to provide a card weight for a card feed mechanism used in a hopper for a business machine which can center itself with respect to the sides of the hopper so as to exert pressure on the cards at the picker knives, yet capable of being removed in a straight line out of the hopper through an opening smaller than the hopper width to thereby save extra motion and time of the operator.

Briefly stated and in accordance with one aspect of this invention, I provide a card weight for use in a card feed mechanism of a business machine, which card weight is provided with pilot arms for centering the main body of the card weight in the hopper, which arms extend outwardly from the body, the weight being capable of being removed through an opening in a joggler plate which is used for patting the cards into alignment, wherein the opening is smaller than the overall arms yet larger than the body.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a perspective view of the file feed and card weight of a business machine.

Fig. 2 i a cross-sectional view of the file feed and hopper showing the position of the card weight just prior to being removed from the hopper.

Figure 1:
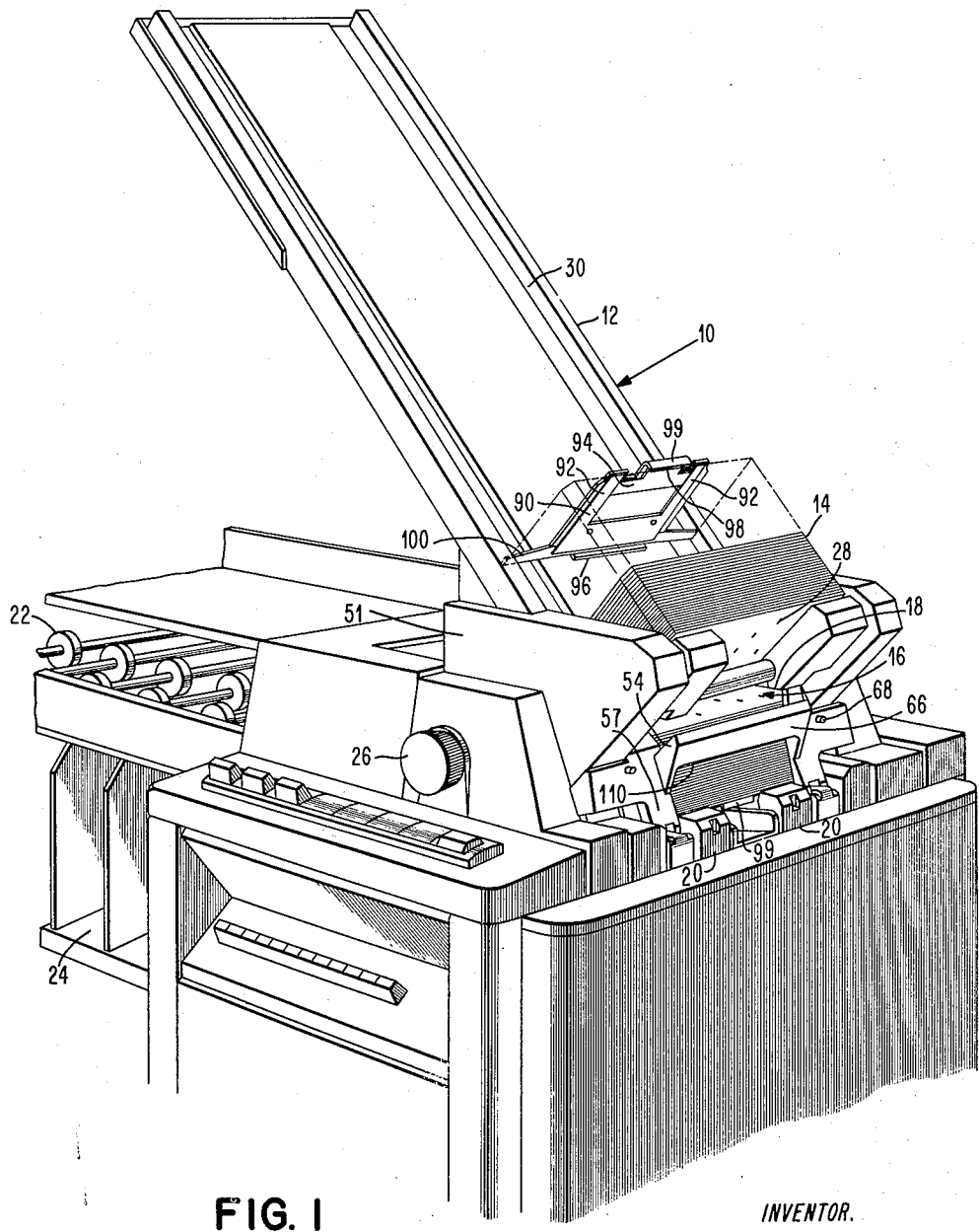

Referring to Fig. 1, a sorter is generally shown at 10. The sorter 10 is intended to be used as a means for explaining the invention, since the invention can be used with other types of business machines such as collators, punches, etc. The sorter 10 includes a file feed 12 containing cards 14 mounted above a hopper 16 containing cards 18. A pair of picker knife housings, to protect the operator from the operation of the picker knife, are shown at 20. For purposes of this invention, I prefer to use two picker knives, and, therefore, two picker knife housings; although a single wide picker knife could also be used. After the picker knives engage the bottom-most card and pass it through a throat (not shown), the cards pass into feed rolls 22 and thence into pockets 24.

After all or just a group of cards have been sorted, brush positioning turning mechanism is provided at 26 which indicates the column that is to be read in the next succeeding deck or group of cards. The brushes that respond to positioning by the turning mechanism read the openings 28 in the cards 14.

Now, referring more specifically to the file feed 12, sides 30 form guides for the cards 14. The guides are spaced by an amount sufficiently greater than the cards themselves to permit the card to be placed in the file feed in a staggered condition. Generally 3/8" has been used as a clearance for each side of the card. In order to separate the cards into groups, card weights 32 are provided. Also, these card weights are used as automatic indicator means when the last card is fed out of the hopper. Furthermore, the last cards do not have sufficient weight to settle properly on the picker knives and throat. Therefore, the card weight provides the necessary pressure on the card at the critical picking and throat areas. This pressure is normally supplied when a large number of cards act on the bottom-most card.

Figure 2:
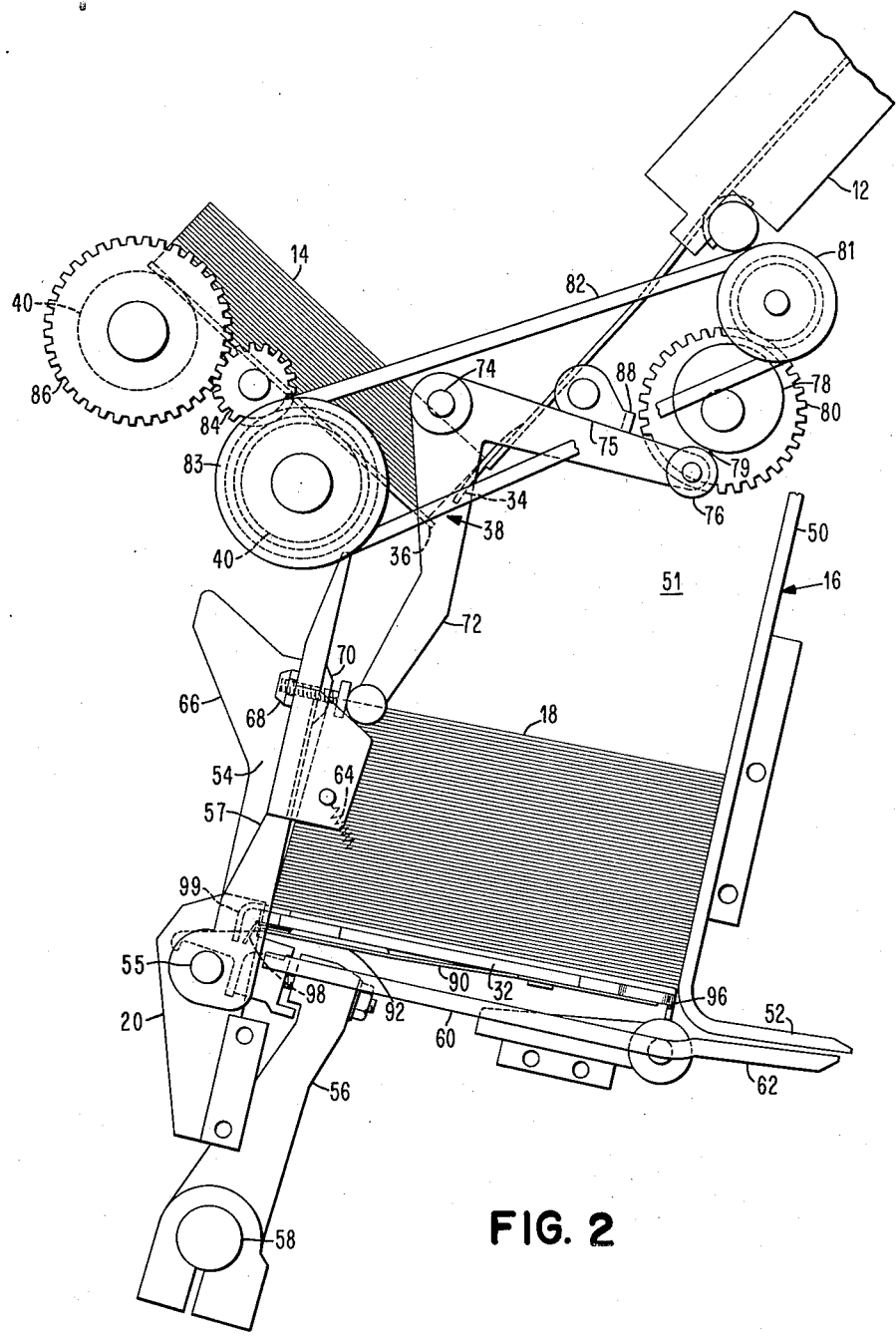

Referring now to the details of the file feed in Fig. 2, a leaf spring is shown at 34 which cooperates with the lower edge 36 of the file feed to form a throat 38 through which cards can be fed from the file feed. In order to feed the cards from the file feed, friction rollers 40 act on the bottom-most card and the card weights to deliver them into the hopper.

Referring now more specifically to the hopper 16, a front wall 50 is provided which terminates into an upper throat guide 52. Side plates for the hopper are provided at 51. In order to pat the staggered cards into alignment as they come out of the file feed into the hopper, a joggler plate 54 pivoted at 55 is provided at the rear of the hopper. A picker knife assembly 56 is shown in order to pick the bottom-most card and pass it through the throat. This is an arc type picker knife and is pivoted at 58. Of course, other types of picker knives could be used such as those that translate in a single plane rather than move in an arc such as the type shown. A bed plate is shown at 60 to help support the cards as they drop into position for feeding on the picker knife and throat. The bed plate terminates into a lower throat guide 62 and together with the upper throat guide 52 form a guide for the cards.

Referring now to the joggler plate 54 that pats the cards into proper position for picking by the picker knife, it is held against the side plates 51 of the hopper by a spring 64. In order to pivot the joggler plate 54 out of the way to permit access into the hopper, a handle 66 is provided on the joggler plate. A variable set screw is shown at 68 which is an instrumental component in controlling the joggling of the joggler plate as well as the feeding of the cards from the file feed into the hopper. Since the height of the stack of the cards 18 in the hopper is relied upon to determine when the file feed delivers cards into the hopper, a means for sensing this height, so as to start or cut off feeding, is provided by the projection 70. When the cards are positioned below the projection, cards continue to feed since the projection no longer strikes the cards and the head on the set screw 68 acts on the bell crank arm 72 to urge it further to the right to operate the file feed. However, when the cards are stacked up higher than the bottom portion of the projection, then the joggler plate does not actuate the bell crank arm 72 the required distance to operate the file feed.

In order to move the joggler plate back and forth against the action of the spring 64, the bell crank arm 72 is pivoted at the bell crank pivot 74. The other end of the bell crank has a follower 76 mounted thereon and adapted to engage a cam 78. It is noted that a small place 79 is provided between the follower 76 and the low portion of the cam 78, the purposes of which will be more fully hereinafter explained. The cam 78 is mounted on gear 80 so as to rotate therewith. The gear 80 is driven by a driving pulley and gear assembly 81 which also drives pulley 83 through a belt 82. A drive idler gear is shown at 84 in order to drive gear 86.

A bail is shown at 88 which energizes the means (not shown) to start the feed rolls 40 for feeding the cards from the file feed. The bail 88 is urged upwardly by the arm at 75 when the stack of cards 18 in the hopper drops below the projection 70. The projection permits the bell crank to pivot a greater amount so that the arm at 75 can move upwardly due to the space 79 being available at the low portion of the cam 80. Normally the cam 78 actuates the follower 76 so that the arm 72 can actuate the joggler in one direction, and the spring 64 actuates the joggler plate 54 in the opposite direction.

The card weight 32 contains a leaf spring 90 fixed to the forward end of the card weight. The leaf spring is substantially of rectangular shape (Fig. 1) and projects downwardly away from the under side of the rear of the card weight 32. The side arms 92 of the spring extend out of the plane of the intermediate connecting portion 94 connecting the two side arms. This construction of the spring permits side arms 92 to engage the cards near the picker knives. This is critical in order to absorb the bounce in the spring rather than in the weight itself as the picker knife oscillates. The spring acts as a vibration damper so as to minimize the possibility of the card floating above the picker knife by the card and weight being bounced. The forward portion of the card weight itself (Fig. 2) contains a bent over lip portion 96 which normally acts on the throat block to keep the leading edge of the card down on the throat block to pass through the throat. Since the side arms 92 act on the card at the picker knife, the spring contains a bent over portion at 98 that is easily accessible by the operator to lift the side spring arms 92 above the picker knives to enable the card weight to be removed. A bent over portion 99 on the card weight provides a means against which the spring arms 92 can be urged out of the way of the picker knives.

In order that the card weight be passed through the throat 38 in the file feed, the card weight must be sufficiently wide to provide a means for each pair of the friction rollers 40 to engage the card weight. The card weight must provide a surface of sufficient width for the spaced-apart rollers 40 to drive the weight into the hopper.

In order to remove the card weight from the bottom of the deck without having to pivot the joggler plate 54 out of the way and to prevent accidentally pulling out some of the bottom cards with the card weight as well as preventing wear and tear on the joggler plate and clutching mechanism each time the card weight is removed, the card weight 32 is provided with pilot arms 100 (Figs. 3 and 4) positioned on either side of the main body 102. The pilot arms 100 are pivoted to the main body as shown at 104. It is important that the pilot arms 100 extend substantially to the sides of the hopper so as to properly locate the body 102 with respect to the picker knives. This is important in order to apply pressure to the cards at the picker knife. In order to do this, the sides 92 of the spring 90 act on the card so as to apply pressure on the card in front of each of the picker knives 56. If the clearance is too great so as not to center the card weight in the hopper, it will permit the card weight to slide to one side or the other. Then the pressure will not be applied at the critical picking knife area. It is, therefore, important that the card weight not only be centered but that it apply its weight at the critical areas.

Figure 3:
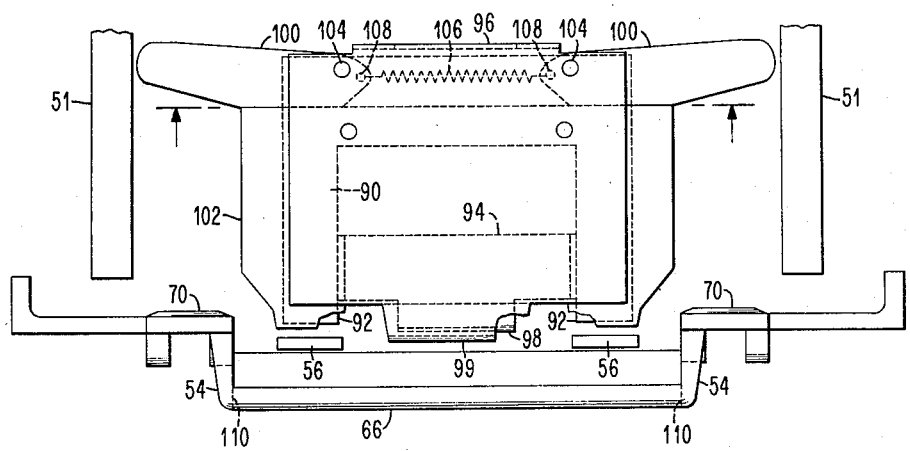
Fig. 3 is a plan view showing the position of the card weight in the hopper.

In order that the pilot arms be retractable, a spring 106 is connected to each of the pilot arms as shown at 108. This spring is used to bring the pilot arms back to their piloting position as shown in Fig. 3.

An opening is shown at 110 in the joggler plate 54 (as best seen in Fig. 1) through which the body of the card weight 102 can pass.

Figure 4:
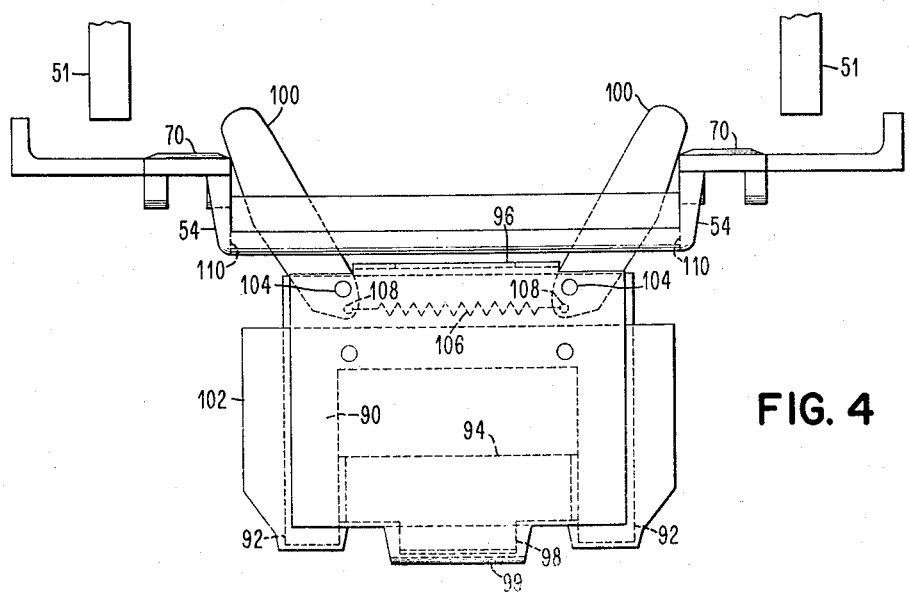
Fig. 4 is a plan view showing the position of the card weight as it is being removed through the opening in the joggler plate.
Figure 5:
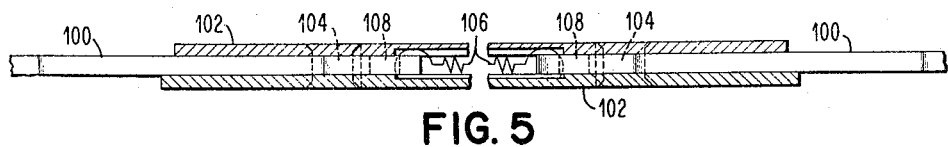
Fig. 5 is a cross-sectional view of the card weight.

Reference is made to Fig. 4 where the card weight is shown partially removed from its position between the sides of the hopper 51 and passed through the opening 110 with the pilot arms 100 retracted. It is therefore seen that the card weight can be removed in a simple straight backward motion since the pilot arms 100 will collapse and permit the weight to be extracted from the hopper. If any cards tend to adhere to the card weight, they will abut against the side arms 57 of the joggler plate 54 at or below the projection 70. There is no necessity for the joggler plate to be pivoted out of the way merely for the removal of the card weight.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A card feed mechanism comprising a hopper containing cards to be removed by a picker knife for passing through a throat onto feed rolls, a card weight positioned in the hopper requiring removal therefrom for operation of the mechanism, a pivotable joggler plate connected to the hopper adapted to pat the cards in proper picking alignment in the hopper, an opening in the joggler plate, means on the card weight permitting the card weight to be removed from the hopper through the opening in the joggler plate without the necessity of pivoting the joggler plate.

2. In a card feed mechanism provided with a hopper for containing cards, a picker knife for singly picking the bottom-most card in the hopper to pass through a throat, a pivotable joggler plate mounted on the hopper to pat the trailing edge of the cards, arms on the joggler plate being positioned inwardly from the end portions of the card as the means for patting the cards, the distance between the arms forming an opening through which a card weight can be removed, a card weight having pilot arms to center the card weight in the hopper with respect to the picker knives, the card weight being extractable through the opening which is smaller than the over-all distance of the pilot arms.

3. In a card feed mechanism including a file feed, a hopper for receiving cards from the file feed, a picker knife for singly removing the cards from the hopper and positioned at the trailing edge of the hopper, a card weight adapted to be positioned in the file feed, a throat through which the card weight can pass into the hopper, a pivotable joggler plate mounted on the rear of the hopper for patting the cards in proper picking position in the hopper, the joggler plate having side arms adapted to engage the cards when the joggler is pivoted, the arms of the joggler plate being spaced a distance substantially less than the width of the card, pilot arms on the card weight for centering the card weight in the hopper so that the body of the card weight acts on the card at the picker knife, the pilot arms extending the width of the hopper with the body smaller than the opening between the side arms of the joggler plate, the pilot arms being retractable so that the card weight can be removed from the hopper through the opening formed between the side arms of the joggler plate in a straight rearward direction, whereby any cards that tend to adhere to the card weight as it is being removed will be retained in the hopper by the side arms of the joggler plate.

4. A card weight for use in a business machine, a support body, retractable pilot arms pivoted to the body, a spring connected to the pilot arms to normally keep them extended outwardly from the body, when in retracted position, the pilot arms extending out of the way of the body of the card weight.

5. In a card feed mechanism, a hopper containing cards, picker means for singly removing the cards, a card weight positioned in the bottom of the hopper to prevent the picker means from prematurely picking the cards, spring means on the card weight for exerting pressure on the card at the critical picking area, an opening in the hopper to permit lifting the spring off the picker means, and retractable means on the card weight to permit removal of the card weight through the opening which is smaller than the over-all width of the card weight.

6. In combination, a hopper containing cards, picker means for removing the cards, a card weight, spring means on the card weight and positioned at the picker means for applying pressure on the last few cards, means for removing the card weight before the following cards can be removed by the picker knife, means for retracting the spring means above the picker means, and an opening in the hopper through which the card weight can be removed.

No references cited.